(12) United States Patent
Yamada

(10) Patent No.: US 6,442,348 B1
(45) Date of Patent: Aug. 27, 2002

(54) CAMERA WITH A LIGHT EMITTER

(76) Inventor: Toshiki Yamada, 12-44, Higashi-Kaigankita 4-chome, Chigasaki-shi, Kanagawa 253-0053 (JP)

( * ) Notice: Subject to any disclaimer, the term of this patent is extended or adjusted under 35 U.S.C. 154(b) by 0 days.

(21) Appl. No.: 09/565,485

(22) Filed: May 5, 2000

(30) Foreign Application Priority Data

May 7, 1999  (JP) ............................................. 11-126987

(51) Int. Cl.$^7$ .......................... G03B 17/18; G03B 17/02
(52) U.S. Cl. ........................................... 396/281; 396/6
(58) Field of Search ............................... 396/1, 2, 281, 396/286, 547, 429, 6

(56) References Cited

U.S. PATENT DOCUMENTS

| | | | |
|---|---|---|---|
| 4,072,973 A | * 2/1978 | Mayo | 396/544 |
| 4,298,869 A | * 11/1981 | Okuno | 345/82 |
| 4,959,670 A | * 9/1990 | Thayer Jr. | 396/2 |
| 5,784,652 A | * 7/1998 | Schroder et al. | 396/6 |

* cited by examiner

Primary Examiner—Russell Adams
Assistant Examiner—Arthur A. Smith
(74) Attorney, Agent, or Firm—Armstrong, Westerman & Hattori, LLP

(57) ABSTRACT

A phototaking camera having light emitters includes an electro-optic, light-emitting display assembly provided on its form surface side, which includes a light-emitting display unit that emits light to display a pattern as if the displayed pattern were rotated, or enlarged or contracted or moved forward or backward by lighting-up or blinking of an array of light emitters, and a light-emitting display control circuit far driving said light-emitting display unit. With a power switch put on for shooting, the light emitters are lit up or blinked as mentioned above. Since a subject such as a figure directs attention to the lighting-up or blinking of the light emitters, there is no risk of a failure in shooting.

6 Claims, 6 Drawing Sheets

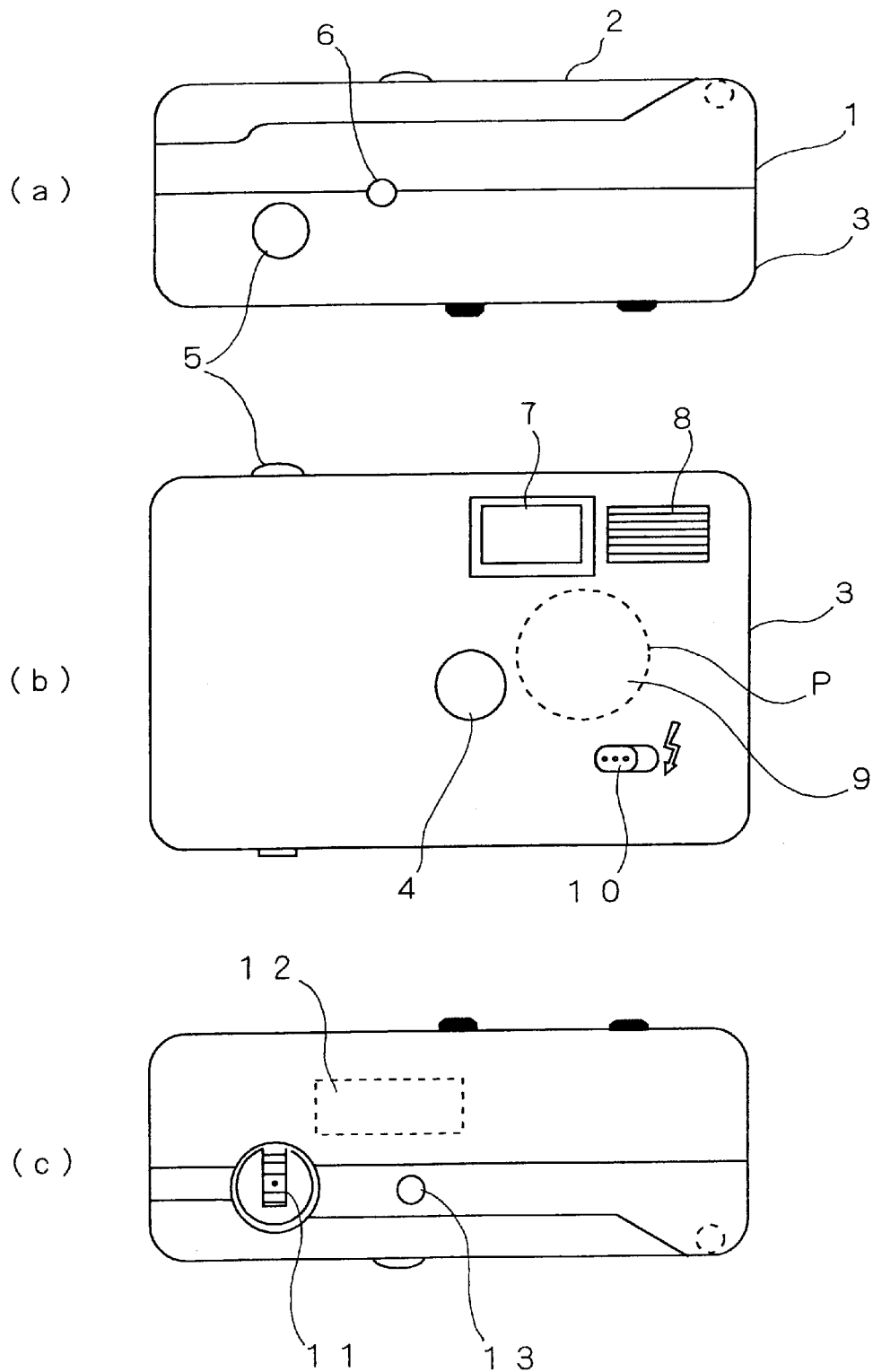
F I G. 1

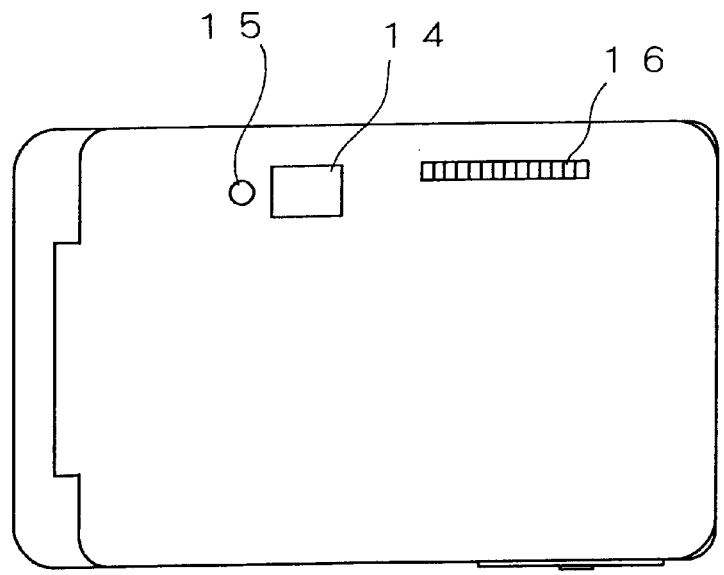
F I G. 2
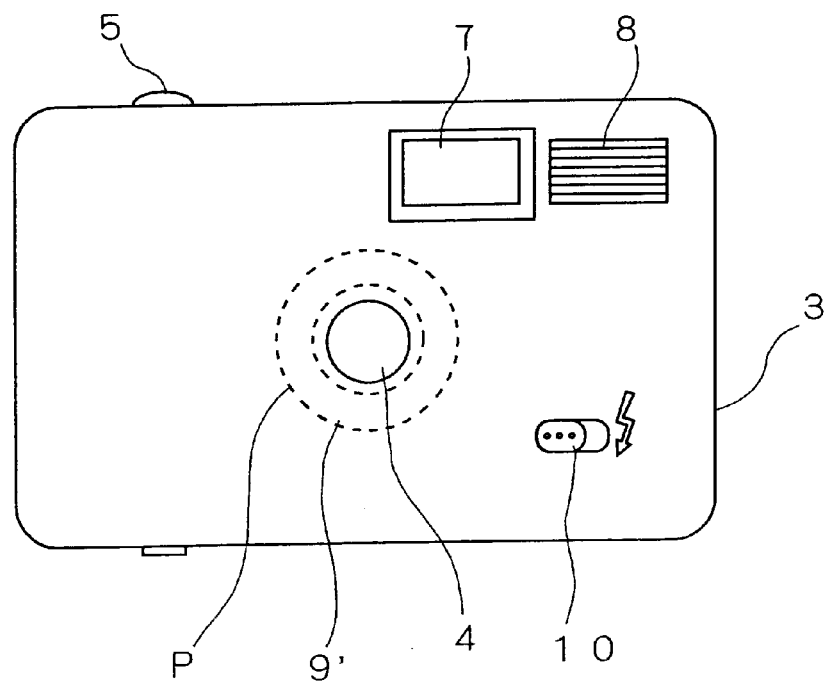
F I G. 3

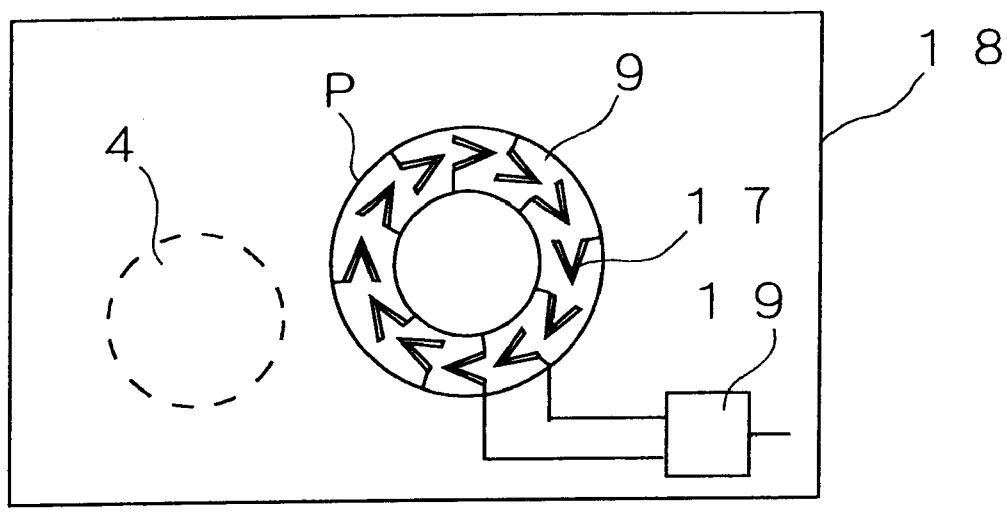
F I G. 4
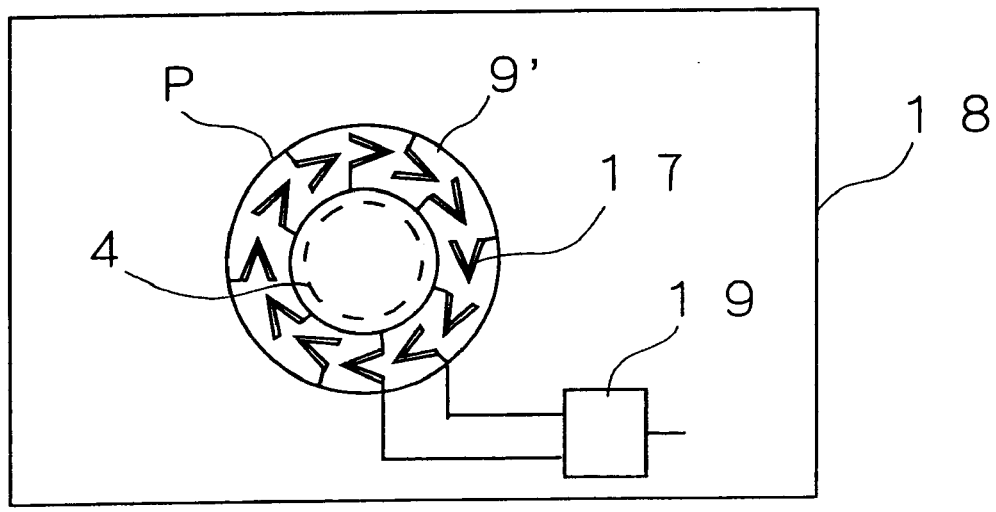
F I G. 5

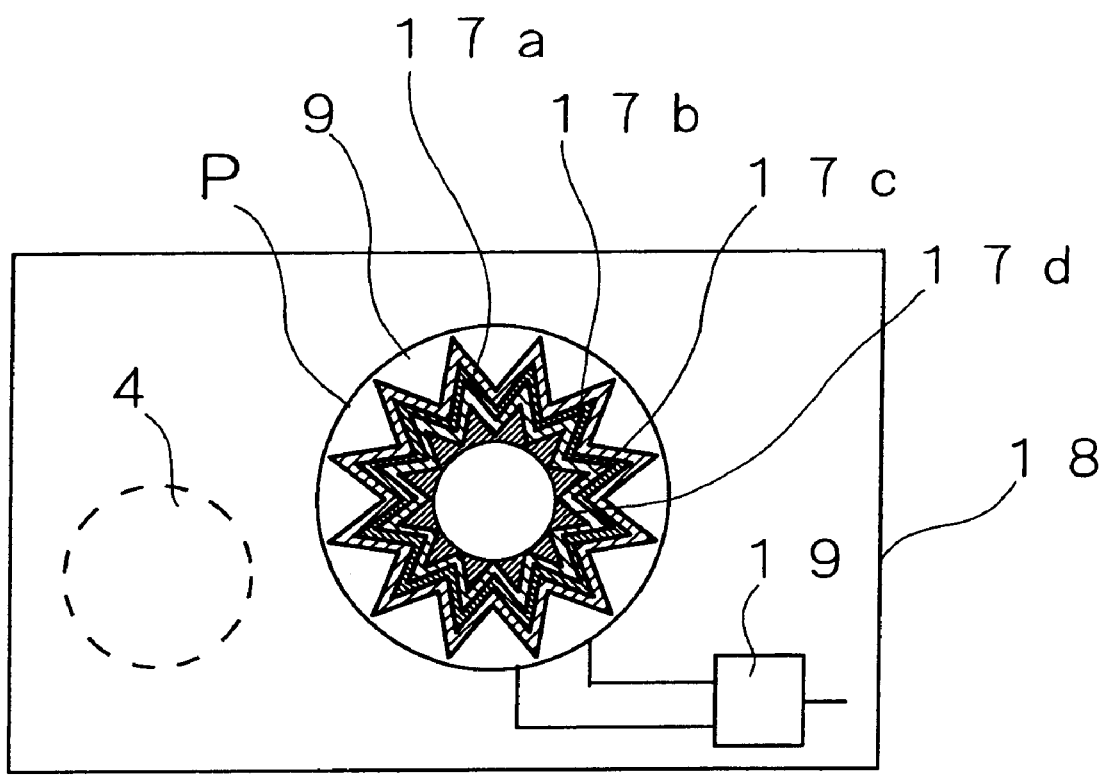
F I G. 6

CAMERA WITH A LIGHT EMITTER

TECHNICAL ART

The present invention relates to a camera having light emitters, which is provided on its front surface side with a special light-emitting display unit, thereby enabling a satisfactory photograph of a subject such as a figure or animal to be easily and reliably taken.

BACKGROUND ART

With the recent advent of high-resolution yet high-sensitivity silver salt films, single-use cameras that make less blurred shots possible are widely commercially available as phototaking cameras because much greater focal depths can be achieved through inexpensive fixed-focus optical lenses. These single-use cameras also make night shooting possible if used in combination with a flash device.

Moreover, high-resolution yet high-sensitivity video or digital cameras, too, are available at low prices.

For this reason, even ordinary peoples having no high level of shooting technique have increasing chances of buying such cameras readily for shooting.

However, even these cameras are now required to have much more functions at much lower costs for product differentiation.

In view of such situations as explained above, the present invention provides a camera having light emitters, which is provided on its front surface side with a light-emitting display unit that emit light to display a pattern as if the displayed pattern were rotated, or enlarged or contracted or moved forward or backward. With this camera, unique shutter-releasing chances are easily obtainable, because the light-emitting display unit allows subjects, especially little children or pets such as dogs or cats to look hard at the camera with zest.

DISCLOSURE OF THE INVENTION

An object of the present invention is to provide a phototaking camera which is provided on its front surface side with a specially designed light-emitting display unit that enables unique shutter-releasing chances to be easily and reliably obtainable. The phototaking camera according to the invention is embodied as follows.

(1) A phototaking camera having light emitters, including an electro-optic, light-emitting display assembly provided on a front surface side of said camera, which comprises a light-emitting display unit that emits light to display a pattern as if the displayed pattern were rotated by lighting-up or blinking of an array of light emitters, and a light-emitting display control circuit for driving said light-emitting display unit.

(2) A phototaking camera having light emitters, including an electro-optic, light-emitting display assembly provided on a front surface side of said camera, which comprises a light-emitting display unit that emits light to display a pattern as if the displayed pattern were enlarged or contracted or moved forward or backward by lighting-up or blinking of an array of light emitters, and a light-emitting display control circuit for driving said light-emitting display unit.

(3) The phototaking camera having light emitters according to (1) or (2), which comprises a camera body having therein a lens with a shutter mechanism, a film drive mechanism, a shutter button, a finder unit, a flash device, a battery power source and a power switch, and an electro-optic, light-emitting display assembly including a front cover formed of a transparent material and having on a surface of said front cover said light-emitting display unit and said light-emitting display control circuit for driving said light-emitting display unit.

(4) The phototaking camera having light emitters according to any one of (1) to (3), wherein said electro-optic, light-emitting display assembly is actuated by putting on a power switch (or a switch for actuating said assembly) or a flash charge switch, and stopped by pushing a shutter button or a phototaking finish button upon completion of phototaking.

(5) The phototaking camera having light emitters according to (3) or (4), wherein said light-emitting display unit is located on a back surface side of said front cover formed of a transparent material.

(6) The phototaking camera having light emitters according to any one of (3) to (5), wherein said front cover formed of a transparent material is integrally provided with a combined film counter and character-magnifying lens.

(7) The phototaking camera having light emitters according to any one of (3) to (5), wherein said front cover formed of a transparent material also serves as a cover for preventing detachment of a plurality of batteries received therein and includes a metal plate for coming into contact with electrodes of each battery for electrical connections.

(8) The phototaking camera having light emitters according to any one of (3) to (6), wherein a sheet formed of paper or an opaque material is inserted into a space between said camera body and said front cover formed of a transparent material, said sheet formed of paper or an opaque material having an opening at a position in engagement with each of said lens, said finder unit, said flash device, said light-emitting display unit and said power switch, said opening conforming to a surface contour of each part.

Other objects, features, and advantages of the invention will be apparent to one person skilled in the relevant art in the light of the following descriptions. However, it is understood that the present disclosure including examples of the invention is given to explain preferred embodiments of the invention by way of illustration but not by way of limitation.

From what is disclosed herein, it will be apparent to those skilled in the relevant art that many alterations and/or modifications may be made within the purport and scope of the invention disclosed therein.

BRIEF DESCRIPTION OF THE DRAWINGS

FIG. 1(a) is a top schematic illustrative of a skeleton type camera having light emitting elements or light emitters according to Example 1 of the invention.

FIG. 1(b) is a front schematic illustrative of the skeleton type camera having light emitting elements according to Example 1.

FIG. 1(c) is a bottom schematic illustrative of the skeleton type camera having light emitting elements according to Example 1.

FIG. 2 is a rear schematic illustrative of the skeleton type camera having light emitting elements according to Example 1.

FIG. 3 is a front schematic illustrative of a skeleton type camera having light emitting elements according to Example 2 of the invention.

FIG. 4 is a circuit block diagram for an electro-optic, light-emitting display device used in Example 1.

FIG. 5 is a circuit block diagram for an electro-optic, light-emitting display device used in Example 2.

FIG. 6 is a circuit block diagram for an electro-optic, light-emitting display device used in Example 3 of the invention.

FIG. 8(*b*) is a sectional schematic taken along the line A–A' in FIG. 8(*a*).

EXPLANATION OF THE REFERENCES NUMERALS

1: camera body,
2: back lid,
3: front cover,
4: lens,
5: shutter button,
6: combined film counter and character-magnifying lens
7: finder objective,
8: diffuse lens for flash device,
9, 9': light-emitting display unit,
10: power switch,
11: film rewind knob,
12: battery holder,
13: rewind lock button,
14: finder eyepiece,
15: standby LED,
16: film take-up knob,
17: light emitters,
18: electro-optic, light-emitting display assembly,
19: light-emitting display control circuit,
20: sheet formed of paper or resin,
21: opening for finder,
22: opening for flash device,
23: opening for lens,
24: opening for light-emitting display unit,
25: opening for power switch,
26: oscillation circuit,
27: count circuit,
28, 29: drive circuit,
30: batteries, and
P: displayed pattern.

BEST MODE FOR CARRYING OUT THE INVENTION

The present invention provides technologies for a camera with light emitters, which comprises a light-emitting display unit that emits light to display a pattern as if the displayed pattern were rotated, or enlarged or contracted, or moved forward or backward by the lighting-up or blinking of an array of light emitters, and a recyclable camera with light emitters, which comprises a front cover formed of a transparent material and a seeing-through light-emitting display unit added onto the surface of the front cover.

The term "phototaking camera" used herein refers primarily to a photographic camera having a silver salt film or the like loaded therein to take shots of figures, animals, etc. However, it is understood that the phototaking camera also embraces every camera from a portable camera using a solid-state imaging device, a magnetic tape, etc. to achieve recording and reproducing functions to a digital camera using a solid-state imaging device and a solid memory to perform recording and reproducing functions.

The term "light-emitting element or light emitter" used herein, for instance, refers to a high-luminance light emitting diode or fluorescent display tube that emits light upon energized.

MODE OF CARRYING OUT THE INVENTION

Figure 7:
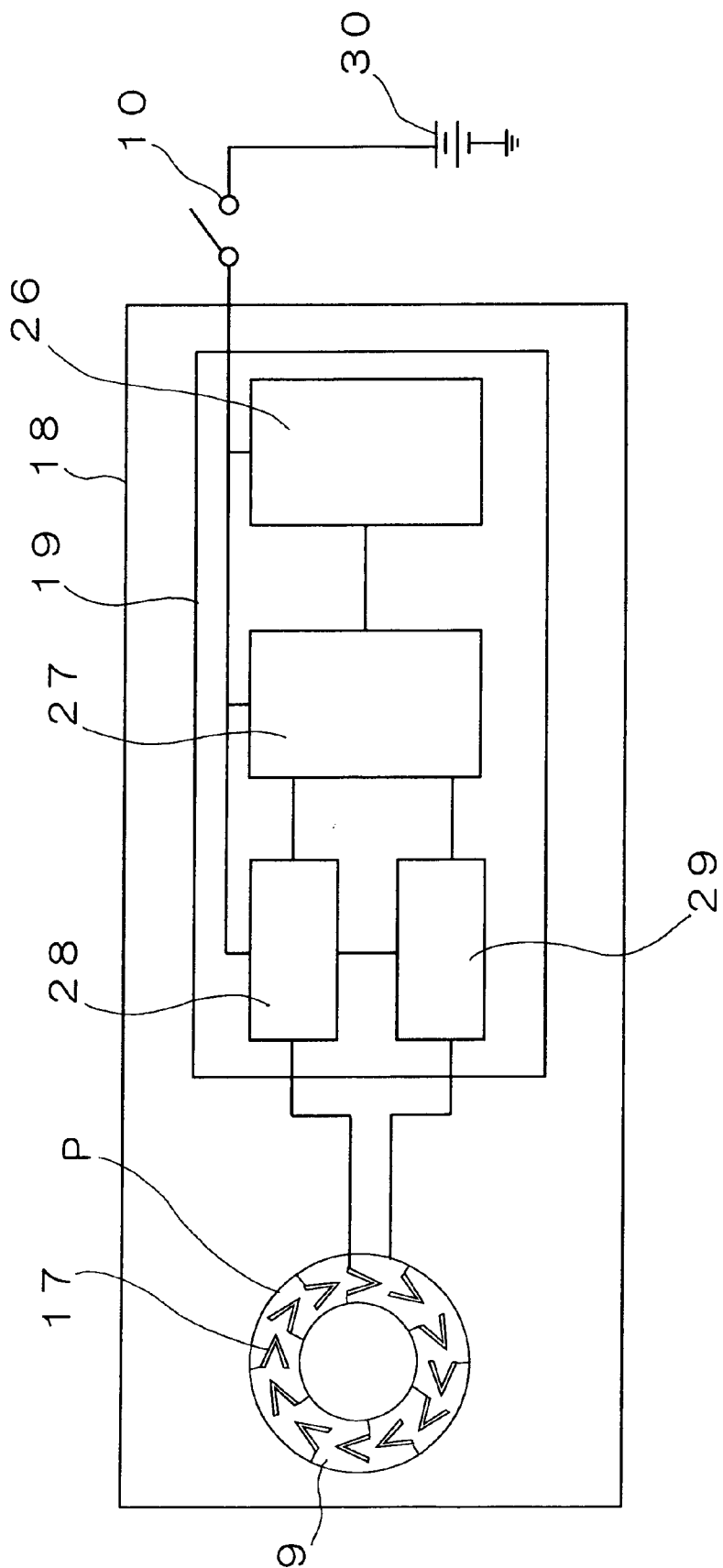
FIG. 7 is a circuit diagram depicting details of the electro-optic, light-emitting display device.
Figure 8:
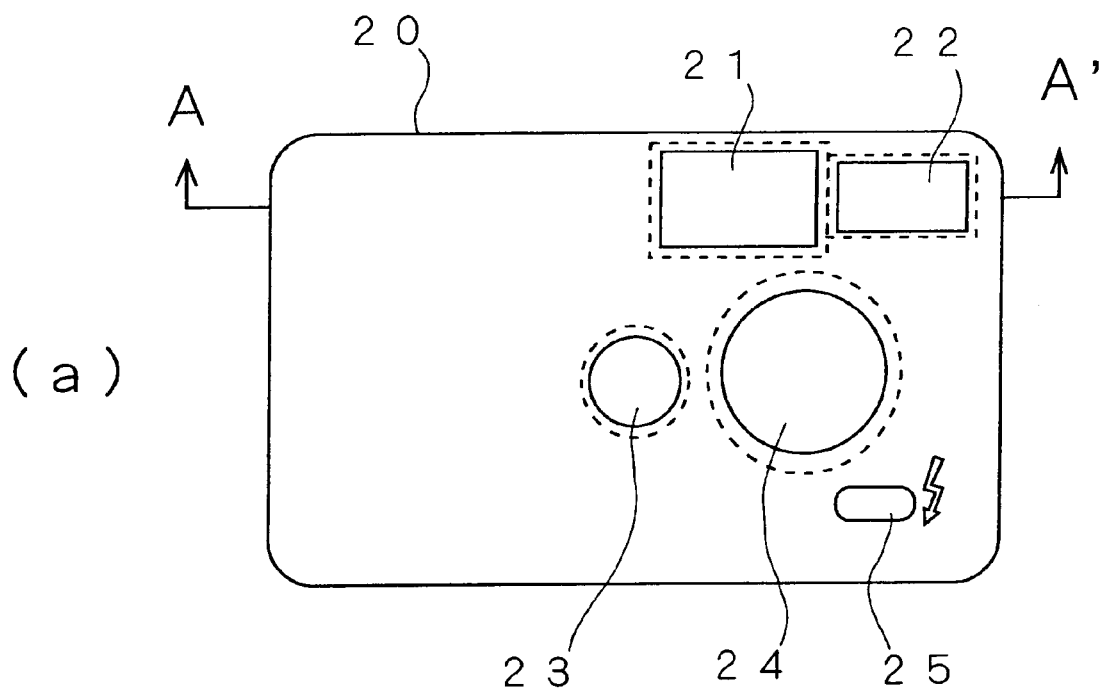
FIG. 8(*a*) is a front schematic illustrative of a sheet inserted between a camera body and a front cover.
Figure 8:
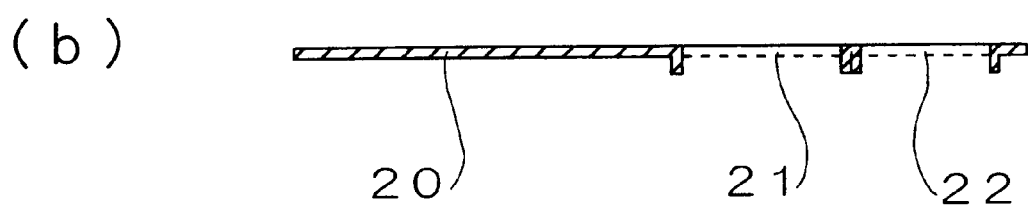

FIG. 1(*a*) is a top schematic illustrative of a skeleton type camera having light emitting elements or light emitters according to Example 1 of the invention; FIG. 1(*b*) is a front schematic illustrative of the skeleton type camera having light emitting elements according to Example 1; FIG. 1(*c*) is a bottom schematic illustrative of the skeleton type camera having light emitting elements according to Example 1; FIG. 2 is a rear schematic illustrative of the skeleton type camera having light emitting elements according to Example 1; FIG. 3 is a front schematic illustrative of a skeleton type camera having light emitting elements according to Example 2 of the invention; FIG. 4 is a circuit block diagram for an electro-optic, light-emitting display device used in Example 1; FIG. 5 is a circuit block diagram for an electro-optic, light-emitting display device used in Example 2; FIG. 6 is a circuit block diagram for an electro-optic, light-emitting display device used in Example 3 of the invention; FIG. 7 is a circuit diagram depicting details of the electro-optic, light-emitting display device; FIG. 8(*a*) is a front schematic illustrative of a sheet inserted between a camera body and a front cover; and FIG. 8(*b*) is a sectional schematic taken along the line A–A' in FIG. 8(*a*).

As shown in FIGS. 1 through 7, a camera body 1 is provided on its front surface side with a front cover 3. The front cover 3 is provided with an electro-optic, light-emitting display assembly 18 made up of a light-emitting display unit 9 comprising an array of light emitters 17 that emit light to display a pattern P as if the displayed pattern were rotated, or enlarged or contracted, or moved forward or backward depending on the lighting up or blinking of the light emitters, and a light-emitting display control circuit 19 for driving the light-emitting display unit 9.

The present invention is explained with reference to a skeleton type camera comprising the front cover 3 formed of a transparent material such as acrylic resin and designed in such a way that a shutter mechanism, a printed circuit-board, the light-emitting display unit, etc. can be seen through from the outside. However, it is understood that the front cover is not necessarily formed of such a transparent material; the light-emitting display unit 9 may be mounted directly on the surface of an opaque front cover.

With a skeleton type camera having the front cover 3 formed of a transparent material, it is easy for a subject such as a figure not only to see through the inside light-emitting display unit 9 but also to view the light emission state of the light-emitting display unit, viz., the state where an array of light emitters emit light to display a pattern as if the displayed pattern were rotated, or enlarged or contracted, or moved forward or backward by the lighting-up or blinking of the light emitters.

Preferably, the front cover 3 formed of a transparent material should be molded together with a combined film counter and character-magnifying lens 6.

The electro-optic, light-emitting display assembly 18, for instance, is actuated by pushing a shutter button 5 half, or putting on a power switch 10 (for actuating the assembly; see FIG. 7) or a flash charge switch. Upon giving a push to the shutter button 5, one film frame is exposed optionally with emission of light from a flash device, and the operation of the light-emitting display unit 9 is stopped.

It is preferable to use the front cover 3 of a transparent material as means for preventing detachment of a plurality of batteries loaded in the camera and provide a metal plate for making connection with the electrodes of each battery.

Preferably, the batteries loaded should also have a current delivery capacity enough to operate the flash device and the light-emitting display unit 9 at least 120 times.

In the space between the camera body 1 and the front cover 3 of a transparent material, there should preferably be inserted a sheet 20 formed of paper or an opaque material and having an opening conforming to each of a lens 23, a finder unit 21, a flash device 22 and a light-emitting display unit 24. This sheet 20 can cut off light, and characters, patterns, pictures, etc. can be printed or otherwise formed on the surface of the sheet 20 for aesthetical and ad purposes.

EXAMPLE

While the present invention is now explained with reference to some examples, it is understood that the invention is not limited thereto and so may embrace a variety of embodiments.

Example 1

First, how to use the camera having light emitters according to Example 1 of the invention is explained with reference to the drawings.

Referring to FIGS. 1, 2 and 4, the openable back lid 2 mounted on the camera body 1 is taken off by manipulating a switch (not shown) for taking the lid 2 off or on to load an exposed film cartridge (not shown) at a given position in the camera body 1. Then, the back lid 2 is put back on.

Upon subsequent turning of the film take-up knob 16, the film is automatically taken up. At this time, the power switch 10 is put on to light up the standby LED (light-emitting diode) 15, so that the camera is ready to shoot.

It is noted that the power switch 10 may be designed to be put on by pushing the shutter button half.

Simultaneously with the lighting-up of the standby LED 15, power is supplied to the electro-optic, light-emitting display assembly 18, so that it can be driven by the light-emitting display control circuit 19 to put the light-emitting display unit 9 into operation.

Mounted on the printed circuit board, the light-emitting display unit 9 is made up of an array of light emitters 17 that emit light upon energized, for instance, light-emitting diodes (LEDs) or fluorescent display tubes.

The array of light emitters 17 are connected every other emitter by an interconnecting line, so that they can be alternately lit up and actuated by the light-emitting display control circuit 19 having therein the oscillation circuit 26, count circuit 27 and drive circuits 28 and 29 as if the emitters 17, each in an arrow form, were rotated clockwise.

With the shutter button 5 pushed as by a finger, the flash device (not shown) is actuated to emit light simultaneously with the actuation of the shutter attached to the lens 4, while the light-emitting display unit 9 stops emitting light.

Since the light-emitting display unit 9 is of sufficient light emission luminance and is here located on the back side of the front cover 3 of transparent resin, it is possible to easily observe a subject such as a figure or animal following the movement of the light emitters.

When the last frame is the loaded cartridge is exposed, the rewind lock button 13 mounted on the bottom of the camera body 1 is pushed as by a finger to rewind the film by the film rewind knob 11. Then, the back lid 2 is opened for removal of the exposed film cartridge (not shown). If necessary, a fresh unexposed film cartridge is loaded into the camera body 1 according to the aforesaid manipulation procedure.

The front cover 3 of transparent resin, for instance, is screwed onto the camera body 1. By making use of the transparency of the resin material forming the front cover 3, it is possible to form the combined film counter and character-magnifying lens 6, finder objective 7 and diffuse lens 8 for the flash device at the respective given position by co-molding.

Two AAA batteries are preset by a camera maker in the battery holder 12 formed in the bottom of the camera body 1 when the camera is assembled. Then, the front cover 3 is fixed in place, so that a metal plate (not shown) located at a given position on the portion of the front cover 3 corresponding to the battery holder 12 can be in contact with the respective electrodes of the two AAA batteries for electrical connections.

The two AAA batteries incorporated in the camera body 1 should have a current delivery capacity enough to actuate the flash device and electro-optic, light-emitting display assembly 18 at least 120 times.

Referring to FIG. 7 or the block diagram for the details of the electro-optic, light-emitting display assembly 18, power is supplied thereto upon the power switch 10 put on, so that the light-emitting display control circuit 19 is actuated. This in turn causes the oscillation circuit 26 such as a Schmitt trigger circuit to generate a square wave at a duty ration of about 50%. In the count circuit 27, this square wave is optimized at the most proper blinking interval, so that the array of light emitters 17 in the light-emitting display unit 9 can be alternately blinked by the drive circuits 28 and 29.

Referring to FIG. 8, the sheet 20 formed of paper or resin is inserted into the space between the camera body 1 and the front cover 3. As shown, the sheet 20 is provided with openings 21, 22, 23, 24 and 25 at positions corresponding the finder unit, flash device, lens, light-emitting display unit and power switch, with their shapes conforming to the surface contours of these parts. However, the openings except that for the power switch 10 are provided by bending or molding with cylindrical walls, thereby imparting light-shielding functions thereto.

Example 2

Referring to FIGS. 3 and 5, the light-emitting display unit 9' is located in such a way as to surround the lens 4. With a camera having such a light-emitting display unit 9', it is possible to easily take a photograph of a subject such as a figure while the figure looks hard at the lens 4.

Constructions and actions of the light-emitting display unit 9' and other parts are much the same as those explained in Example 1.

Example 3

Referring to FIG. 6, the light-emitting display unit 9 comprises star-shaped light emitters 17a, 17b, 17c and 17d that decrease in size in this order. In this example, the light-emitting display control circuit 19 allows these emitters to emit light alternately and successively.

In Example 3, the light emitters emit light to dispaly a star-shaped pattern P as if the displayed pattern were contracted (moved backward) or enlarged (moved forward).

Constructions and actions of the light-emitting display unit 9 and other parts are much the same as those explained in Example 1.

In one modification to this example, an array of light emitters 17 in the light-emitting display unit 9 are discretely located just like a starry sky, so that they can be successively blinked clockwise or radially with a certain directivity. In this case, the light emitters emit light to display a pattern as if a number of stars were rotated, or enlarged or contracted, or moved forward or backward.

While the present invention has been described with reference to the camera having light emitters with photographic film loaded therein, it is understood that the electro-optic, light-emitting display assembly 18 may be applied to, for instance, a video camera or digital camera.

POSSIBILITY OF INDUSTRIAL UTILIZATION

According to the present invention as explained above, with the power switch put on, the light-emitting display unit is actuated so that the light emitters can emit light to display a pattern as if the displayed pattern were rotated, or enlarged or contracted or moved forward or backward. With the thus designed camera, unique shutter-releasing chances are easily obtainable because the light-emitting display unit allows subjects such as figures, especially little children or pets such as dogs or cats to look hard at the camera with zest.

What is claimed is:

1. A phototaking camera having an electro-optic, light-emitting display assembly provided on a front surface of said camera, which assembly comprises a light-emitting display unit that emits light to display a pattern as if the displayed pattern were rotated by lighting-up or blinking of an array of light emitters, and a light-emitting display control circuit for driving said light-emitting display unit;
   wherein the camera comprising a camera body having therein a lens with a shutter mechanism, a film drive mechanism, a shutter button, a finder unit, a flash device, a battery power source and a power switch, and an electro-optic, light-emitting display assembly including a front cover farmed of a transparent material and having an a surface of said front cover said light-emitting display unit and said light-emitting display control circuit for driving said light-emitting display unit; and
   wherein said electro-optic, light-emitting display assembly is actuated by turning on one of a power switch, a switch for actuating said assembly, and a flash charge switch, and wherein said electro-optic, light-emitting display assembly is de-actuated by pushing one of a shutter button and a phototaking finish button upon completion of phototaking.

2. A phototaking camera having an electro-optic, light-emitting display assembly provided on a front surface of said camera, which assembly comprises a light-emitting display unit that emits light to display a pattern as if the displayed pattern were enlarged or contracted or moved forward or backward by lighting-up or blinking of an array of light emitters, and a light-emitting display control circuit for driving said light-emitting display unit;
   wherein the camera comprising a camera body having therein a lens with a shutter mechanism, a film drive mechanism, a shutter button, a finder unit, a flash device, a battery power source and a power switch, and an electro-optic, light-emitting display assembly including a front cover farmed of a transparent material and having an a surface of said front cover said light-emitting display unit and said light-emitting display control circuit for driving said light-emitting display unit; and
   wherein said electro-optic, light-emitting display assembly is actuated by turning on one of a power switch, a switch for actuating said assembly, and a flash charge switch, and wherein said electro-optic, light-emitting display assembly is de-actuated by pushing one of a shutter button and a phototaking finish button upon completion of phototaking.

3. The phototaking camera according to either claims 1 or 2, wherein said light-emitting display unit is located on a back surface of said front cover formed of a transparent material.

4. The phototaking camera according to claim 3, wherein said front cover formed of a transparent material is integrally provided with a combined film counter and character-magnifying lens.

5. The phototaking camera according to claim 4, wherein a sheet formed of one of paper and an opaque material is inserted into a space between said camera body and said front cover formed of a transparent material, said sheet formed of one of paper and an opaque material having an opening at a position in engagement with each of said lens, said finder unit, said flash device, said light-emitting display unit and said power switch, said opening conforming to a surface contour of each part.

6. The phototaking camera according to claim 3, wherein said front cover formed of a transparent material also serves as a cover for preventing detachment of a plurality of batteries received therein and includes a metal plate for coming into contact with electrodes of each battery for electrical connections.

* * * * *

UNITED STATES PATENT AND TRADEMARK OFFICE
CERTIFICATE OF CORRECTION

PATENT NO. : 6,442,348 B1
DATED : August 27, 2002
INVENTOR(S) : Toshiki Yamada

It is certified that error appears in the above-identified patent and that said Letters Patent is hereby corrected as shown below:

Title page,
Item [57], ABSTRACT,
Line 3, change "form" to -- front --; and
Line 8, change "far" to -- for --.

Column 5,
Line 58, change "frame is" to -- frame in --.

Column 6,
Line 22, change "duty ration" to -- duty ratio --.

Column 7,
Line 30, change "cover farmed" to -- cover formed --; and
Line 31, change "having an" to -- having on --.

Column 8,
Line 10, change "cover farmed" to -- cover formed --; and
Line 11, change "having an" to -- having on --.

Signed and Sealed this

Eleventh Day of February, 2003

JAMES E. ROGAN
*Director of the United States Patent and Trademark Office*